United States Patent
Donehue

(10) Patent No.: US 8,933,810 B1
(45) Date of Patent: Jan. 13, 2015

(54) ILLUMINATED LIQUID LEVEL INDICATOR

(76) Inventor: Wade L. Donehue, League City, TX (US)

( * ) Notice: Subject to any disclaimer, the term of this patent is extended or adjusted under 35 U.S.C. 154(b) by 336 days.

(21) Appl. No.: 13/506,202

(22) Filed: Apr. 3, 2012

(51) Int. Cl.
*G08B 21/00* (2006.01)

(52) U.S. Cl.
USPC ........................................ 340/618; 340/815.4

(58) Field of Classification Search
CPC ..................................................... G01F 23/74
USPC .............. 340/618, 815.4; 73/1.02, 1.11, 1.22, 73/1.31, 1.33, 314, 319, 326, 328; 137/392, 41, 100
See application file for complete search history.

(56) References Cited

U.S. PATENT DOCUMENTS

| | | | | |
|---|---|---|---|---|
| 4,213,039 A | * | 7/1980 | Schasser | 235/449 |
| 4,229,724 A | * | 10/1980 | Marcus | 340/988 |
| 4,361,835 A | * | 11/1982 | Nagy | 340/624 |
| 4,471,656 A | * | 9/1984 | Sanders et al. | 73/438 |
| 4,514,687 A | * | 4/1985 | Van Husen | 324/537 |
| 4,530,463 A | * | 7/1985 | Hiniker et al. | 239/71 |
| 4,561,904 A | * | 12/1985 | Eberhardt, Jr. | 134/18 |
| 5,148,070 A | * | 9/1992 | Frye et al. | 310/168 |
| 5,161,361 A | * | 11/1992 | Talley et al. | 57/264 |
| 5,874,899 A | * | 2/1999 | Barmore et al. | 340/623 |
| 6,028,521 A | * | 2/2000 | Issachar | 340/624 |
| 6,218,949 B1 | * | 4/2001 | Issachar | 340/624 |
| 6,375,038 B1 | * | 4/2002 | Daansen et al. | 222/52 |
| 6,418,788 B2 | * | 7/2002 | Articolo | 73/314 |
| 6,435,026 B1 | * | 8/2002 | Donehue | 73/314 |
| 6,834,407 B2 | * | 12/2004 | Stephens | 8/158 |
| 7,079,037 B2 | * | 7/2006 | Ross, Jr. et al. | 340/618 |
| 7,129,832 B2 | * | 10/2006 | Sabatino | 340/511 |
| 7,315,255 B2 | * | 1/2008 | Sotiriou | 340/815.4 |
| 7,439,874 B2 | * | 10/2008 | Sotiriou | 340/815.4 |
| 8,400,131 B2 | * | 3/2013 | Li et al. | 323/284 |
| 2002/0022935 A1 | * | 2/2002 | Murphy et al. | 702/60 |
| 2002/0038676 A1 | * | 4/2002 | Siegele et al. | 141/63 |
| 2002/0129663 A1 | * | 9/2002 | Hoyt et al. | 73/861.79 |
| 2003/0089120 A1 | * | 5/2003 | Kampert et al. | 62/188 |
| 2005/0024217 A1 | * | 2/2005 | Sabatino | 340/618 |
| 2005/0269532 A1 | * | 12/2005 | Ross et al. | 250/573 |
| 2006/0244620 A1 | * | 11/2006 | Sotiriou | 340/815.4 |
| 2009/0058666 A1 | * | 3/2009 | Clabaugh | 340/618 |
| 2012/0073493 A1 | * | 3/2012 | Ross, Jr. | 116/227 |

OTHER PUBLICATIONS

Diodes, Incorporated "AH182/AH183 Low Power Hall Effect Switch" Plano, Texas (c) Nov. 2009.
Texas Instruments "SN54AL21A, SN54AS21, SN74ALS21A, SN74AS21 Dual 4-Input Positive-AND Gates" Dallas, Texas (c) 1994.

* cited by examiner

*Primary Examiner* — Jennifer Mehmood
*Assistant Examiner* — Rufus Point
(74) *Attorney, Agent, or Firm* — John R Casperson

(57) ABSTRACT

A liquid level indicator indicates liquid level in a standpipe with a color change in a column of lights positioned alongside the standpipe. The indicator can be used alongside a mechanical indicator which indicates liquid level in a standpipe with a color change in a column of magnetic elements to light the mechanical indicator. The two indicators when used together provide high visibility under all conditions.

4 Claims, 4 Drawing Sheets

ILLUMINATED LIQUID LEVEL INDICATOR

BACKGROUND OF THE INVENTION

My earlier patent, U.S. Pat. No. 6,435,026, the disclosure of which is incorporated by reference herein, describes a magnetically operated liquid level indicator of the kind having a magnetized float which moves as the level of liquid changes in the tank. The position of the float is remotely sensed by a plurality of magnetized indicator elements disposed one above the other and past which the magnetized float travels in a standpipe tubing as the liquid level rises or falls. The indicator elements partly rotate under the influence through the tubing wall of the magnetized float to provide a visual indication of the liquid level contained in the vessel.

One of the shortcomings of prior art level indicators of this type is that it is difficult to read them during hours of darkness, particularly from a distance. An illuminated device would be desirable.

Another of the shortcomings of prior art level indicators of this type is lack of remote reading capabilities. An add-on device having the capabilities of sending electronic level signals to a remote location for reading there would be desirable. Stand-alone capabilities for the device would be further desirable.

Another shortcoming of prior art indicators is a practical upper limit to operating temperature. Where the indicator is used to measure the liquid level of hot fluids, exposure to excessively hot temperatures can lead to failures. An indicator which has good high-temperature resistance would be very desirable.

OBJECTS OF THE INVENTION

It is an object of this invention to provide a liquid level indicator which can be easily viewed from a distance.

It is another object of this invention to provide a liquid level indicator which can be easily viewed in darkness.

SUMMARY OF THE INVENTION

My U.S. Pat. No. 6,435,026 provides a mechanical device to indicate liquid level with a column of two-color indicator elements, which operates to indicate the liquid level with a color change in the column of elements. The mechanical elements are actuated by a magnet system carried by a float on the liquid interface level to be monitored. The present invention provides an indication of liquid level with the same look and feel as my earlier invention, except that the liquid level is indicated by a color change in a column of lights. The two inventions can be combined to provide a lighting system for the mechanical indicator. In a preferred embodiment of the present invention, circuitry is provided to insure that each light in the column is the same color as the light immediately above it, with the exception of the light which is at the level of the float.

In a first embodiment of the invention, there is provided an apparatus comprising an electrical power source, a hall-effect switch, a pair of light-emitting diodes, LEDs, and means for electrically connecting the hall-effect switch with the pair of LEDs. The electrical power source has an electrical output at a first voltage level. The hall-effect switch is electrically connected to the power source. The pair of LEDs are electrically connected to the hall-effect switch. One LED of the pair is for emitting light of a first color when actuated and the second LED of the pair is for emitting light of a second color when actuated. The means for electrically connecting the hall-effect switch with the pair of LEDs is operable to actuate the LED emitting the first color when a magnetic field is sensed by the hall effect switch and extinguish LED of the second color.

In a second embodiment of the invention, there is provided a liquid level indicator comprising a first frame, a plurality of magnetic slats, a second frame, and a circuit board.

The first frame is formed from a nonmagnetic material. It is elongated and has a channel shaped cross section and a bottom wall. The plurality of magnetic slats are pivotally mounted in the first frame. They are parallel and closely spaced, and extend across the channel. Each of the slats has a first face of a first color and an oppositely-facing second face of a second color.

The second longitudinally elongated channel shaped frame is formed of a nonmagnetic material. The second frame comprises a first sidewall, a second sidewall parallel to the first sidewall, and a bottom wall connecting a bottom end of the first sidewall with a bottom end of the second sidewall. The second frame has a longitudinal axis and further comprises a mounting wall positioned parallel to the bottom wall which mounts the second frame to the first frame.

The circuit board is elongated and generally rectangular and is mounted inside of the channel of the second frame. The circuit board carries a plurality of bi-color LED assemblies and a like plurality of hall effect switches operably associated with the plurality of bi-color LED assemblies. The plurality of hall effect switches are spaced apart from each other by a distance equal to the center-to-center spacing between the parallel magnetic slats. The plurality of bi-color LED assemblies are also spaced apart from each other by a distance equal to the center-to-center spacing between the parallel magnetic slats. The bicolor LED assemblies are positioned and oriented to directly light the slats, one LED assembly per slat. The hall effect switches are positioned and oriented to sense a magnetic field passing close to each slat at a location behind the bottom wall of the first frame and are operably associated with a bi-color LED assembly to change the emitted LED color lighting the slat when the magnetic field is sensed.

DETAILED DESCRIPTION OF THE INVENTION

Figure 1:
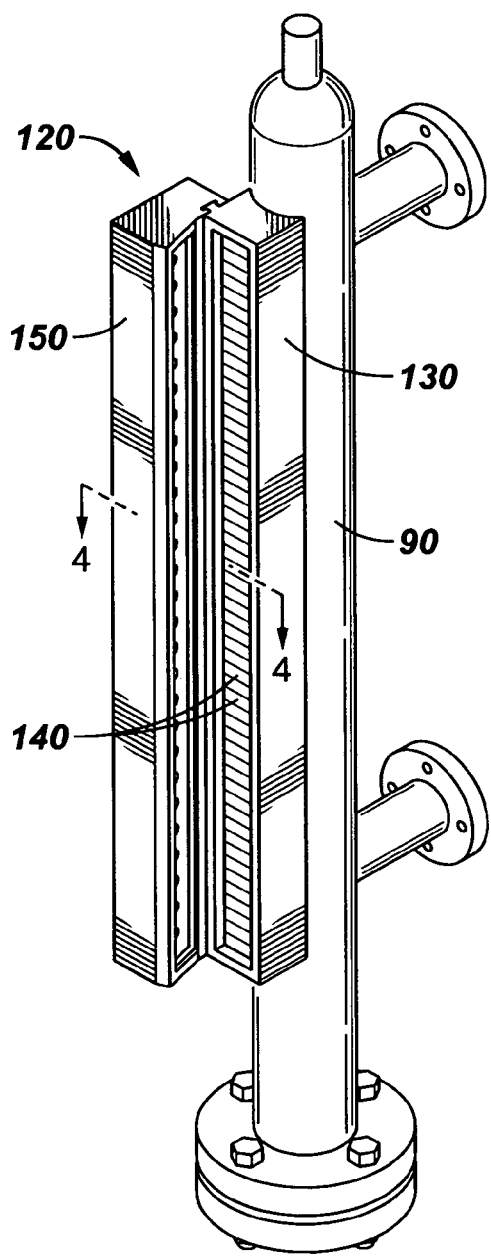
FIG. 1 is a pictorial illustration of one embodiment of the invention.
Figure 2:
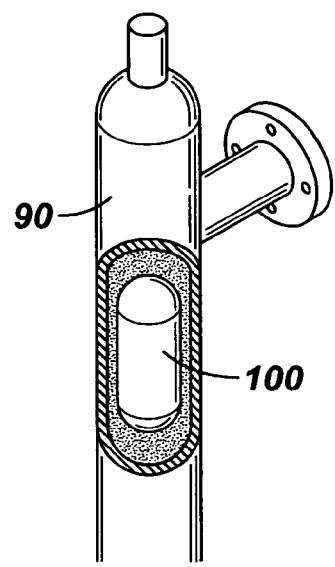
FIG. 2 is a view of a portion of the device shown in FIG. 1, with portions removed to illustrate an internal feature.

With reference to FIG. 2, In a first embodiment of the invention, there is provided an apparatus 10 comprising an electrical power source 20, a hall-effect switch 30, a pair of light-emitting diodes, LEDs 40, and means 50 for electrically connecting the hall-effect switch with the pair of LEDs. See also FIG. 5. The electrical power source has an electrical output at a first voltage level. The hall-effect switch is electrically connected to the power source. The pair of LEDs are electrically connected to the hall-effect switch. One LED 42 of the pair is for emitting light of a first color when actuated and the second LED 44 of the pair is for emitting light of a second color when actuated. The means for electrically connecting the hall-effect switch with the pair of LEDs is operable to actuate the LED emitting the first color when a magnetic field is sensed by the hall effect switch and to extinguish the LED emitting the second color.

In a preferred embodiment of the invention, each hall-effect switch has an output that goes to a reduced voltage level when the switch senses a magnetic field. The pair of LEDs preferably comprise a bi-color LED assembly (schematically illustrated in FIG. 5) which emits light of a first color when receiving an input of a first voltage and light of a second color when receiving an input of a second voltage. The means 50 in a preferred embodiment of the invention for electrically connecting the hall-effect switch with the LED assembly comprises an AND gate 60 electrically connected to the hall-effect switch and an amplifier 70 electrically connected to the AND gate and to the LED assembly.

Each AND gate preferably comprises a first multiple-input electrical AND gate device having a first input leg electrically connected to the output of a hall-effect switch that will go to a reduced voltage level when a magnetic field is sensed and at least one second input leg 64, 66, 68 electrically connected to a high/low power source matched to outputs from the hall-effect switch. The AND gate device has an output 63 which is driven from a higher voltage to a lower voltage when the input from the hall effect switch is driven to a lower voltage.

The amplifier has an input electrically connected to the output of the AND gate device and an output 72 that is of a higher voltage or a lower voltage depending on the input from the AND gate device.

The bi-color LED assembly has a first input connected to the output from the amplifier, a second input connected to the power source, and a ground 25. The bi-color LED light assembly emits the first color when the amplifier output is higher voltage and a second light color when the amplifier output is lower voltage.

Figure 5:
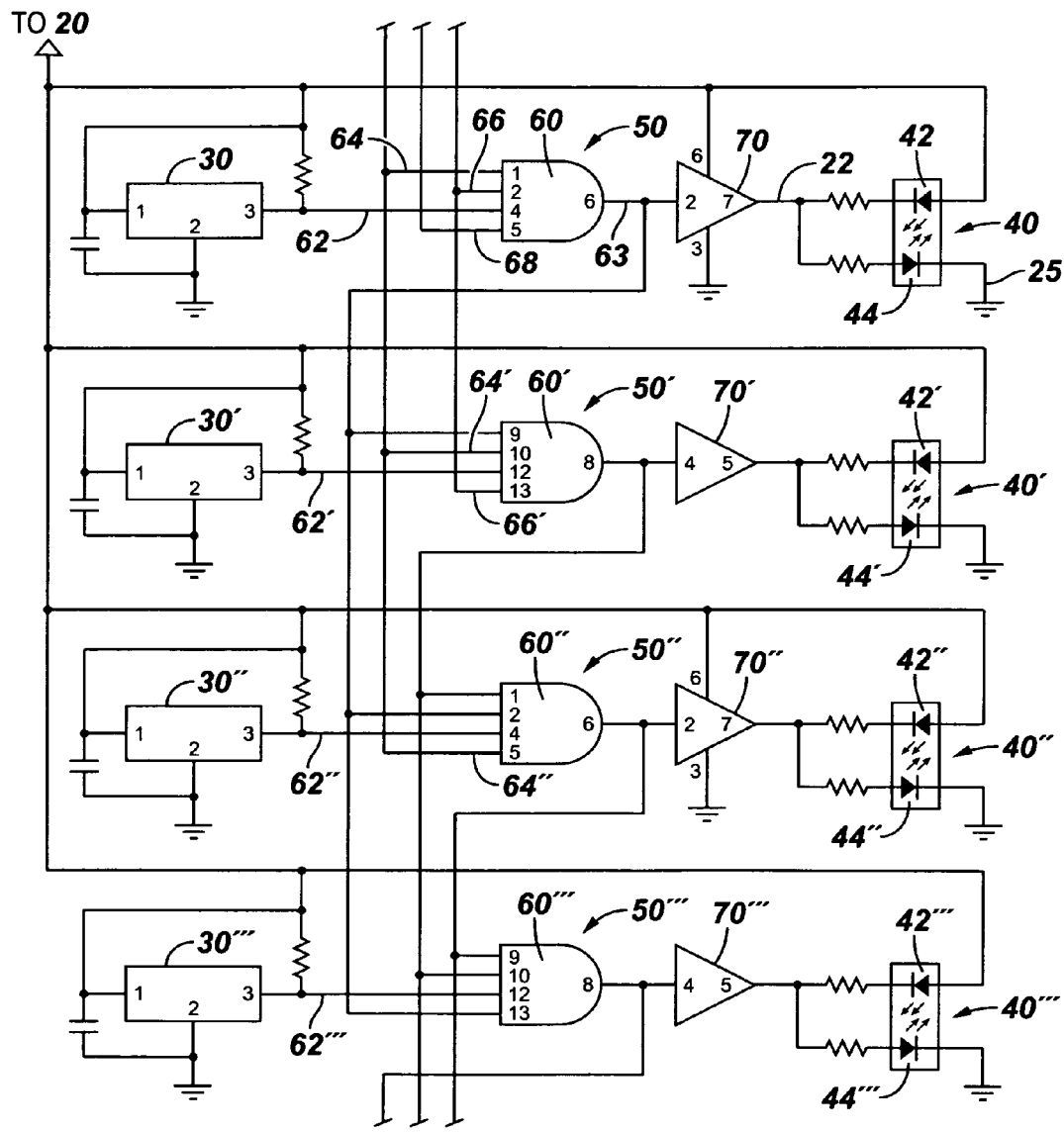
FIG. 5 is a circuit diagram for a portion of a circuit board in accordance with another embodiment of the invention.

The hall-effect switch and the bi-color LED assembly are preferably positioned within a transverse rectangular section of an elongated rectangular circuit board 80 comprising many sections each having a hall-effect switch and a bi-color LED assembly. The multiple-input electrical AND gate device and the amplifier are each positioned within a transverse rectangular section of the elongated circuit board comprising many sections each having a multiple input AND gate device and an amplifier. In FIG. 5, four sections are shown and the like elements in the various sections are designated with the same callouts numerals but differentiated with ', ", and '". Power input and ground are common to all of the sections, since the board is an integrated circuit.

In a preferred embodiment of the invention, each multiple input AND gate device comprises a 4-input (or multiple thereof) AND gate device and, with the exception of a lowermost AND gate device (see AND gate 60'" on FIG. 5) on the rectangular circuit board, an output from each AND gate device constitutes an input for the 4-input AND gate device situated immediately therebeneath. With the exception of the uppermost 3 AND gate devices on the rectangular circuit board, each 4-input AND gate device receives inputs from an additional three AND gate devices situated immediately thereabove. The upper most 3 AND gate devices can have at least one input connected directly to the power source. In the logic of the AND gate devices used in the invention, an AND gate device output from matched inputs is a high voltage signal and an AND gate device output from mismatched inputs is a low voltage signal. The default voltage signal from the hall effect switches is high voltage, except for the signal from the switch under the influence of the magnetic field. A low voltage output from any one of the additional AND gate devices will result in the lowermost AND gate device producing a low voltage output because its inputs will be mismatched. As each of the AND gate devices beneath the uppermost three can be analyzed in terms of being the lowermost AND gate device, it is seen that a low voltage signal from any particular hall-effect switch will cause low voltage outputs from each of the AND gate devices from its level downward to the bottom. Consequently, the bi-color LEDs all emit their first color above the hall-effect switch which senses the magnetic field and their second color from the hall-effect switch which senses the magnetic field and below. Preferably, the bi-color LEDs are lined up on the rectangular circuit board alongside a line of hall effect switches, individual bi-color LEDs being paired with individual hall effect switches, so that a color discontinuity in the line of bi-color LEDs indicates the position of a magnet field on a hall effect switch.

Figure 3:
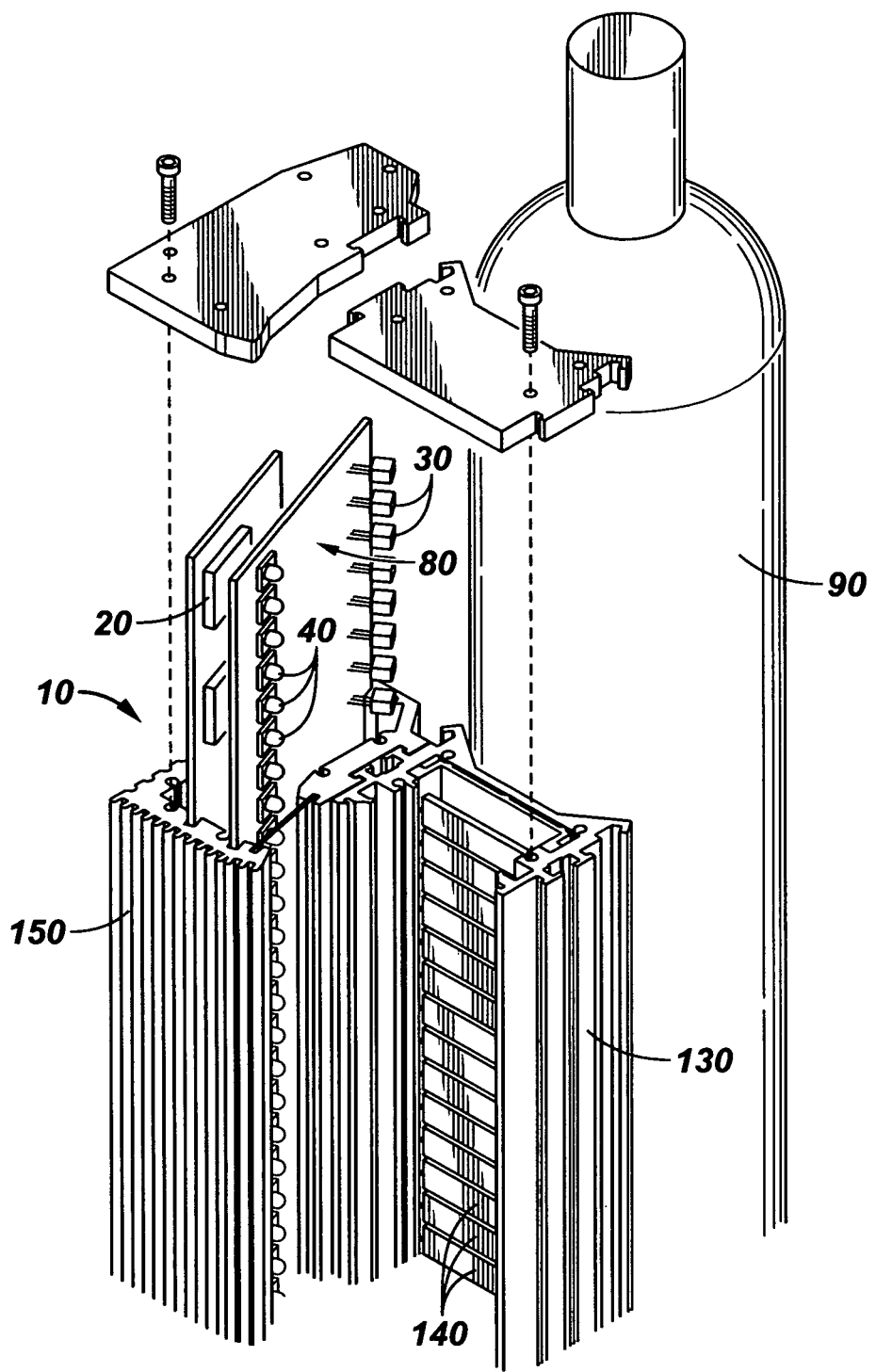
FIG. 3 is an exploded view of a portion of the device shown in FIG. 1, to illustrate internal structures.
Figure 4:
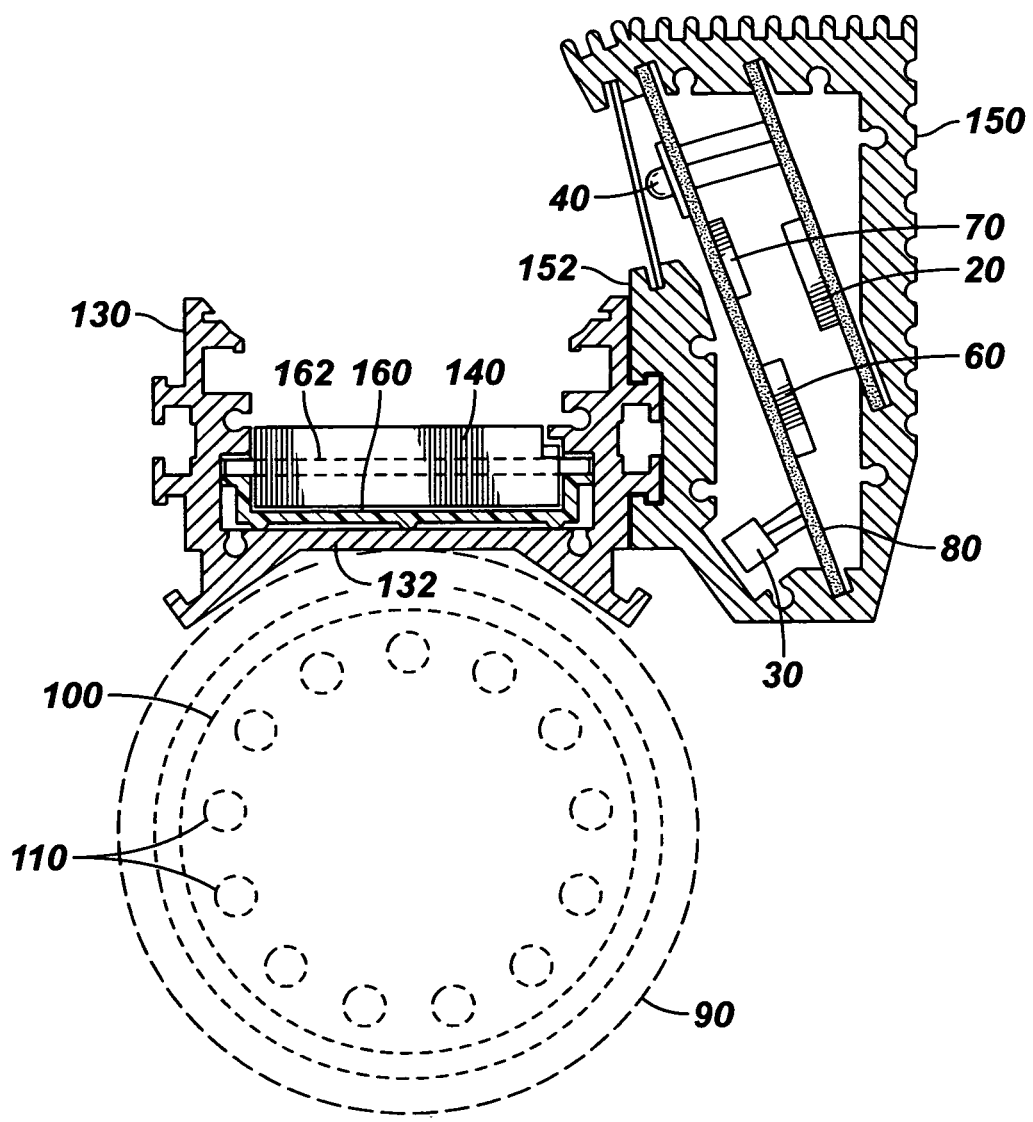
FIG. 4 is a cross sectional view of the device shown in FIG. 1, taken at plane 4-4 shown in FIG. 1.

In a preferred embodiment of the invention, a tube 90 positioned alongside the rectangular circuit board. See FIG. 3. a float 100 is positioned within the tube. See FIG. 2. At least one magnet 110 is positioned within the float. See FIG. 4. The magnet generates a magnetic field sufficiently strong to be sensed by a hall effect switch positioned alongside the magnet. The hall effect switches are preferably lined up on the rectangular circuit board alongside the tube to sense the magnetic field generated by the magnet when the float becomes positioned alongside each such hall effect switch. The causes the position of the float in the tube to be indicated by a color discontinuity in the line of bi-color LEDs.

The device just described can be used in combination with my earlier invention. In a second embodiment of the invention, there is provided a liquid level indicator 120 comprising a first frame 130, a plurality of magnetic slats 140, a second frame 150, and a circuit board 80.

The first frame is formed from a nonmagnetic material. It is elongated and has a channel shaped cross section and a bottom wall 132. The plurality of magnetic slats are pivotally mounted in the first frame. They are parallel and closely spaced, and extend across the channel Each of the slats has a first face of a first color and an oppositely-facing second face of a second color.

The second longitudinally elongated channel shaped frame is formed of a nonmagnetic material. The second frame comprises a first sidewall, a second sidewall parallel to the first sidewall, and a bottom wall connecting a bottom end of the first sidewall with a bottom end of the second sidewall. The second frame has a longitudinal axis and further comprises a mounting wall 152 positioned parallel to the bottom wall which mounts the second frame to the first frame. In the illustrated embodiment, mounting is via a mutual set of interlocking tracks.

The circuit board is elongated and generally rectangular and is mounted inside of the channel of the second frame. The circuit board carries a plurality of bi-color LED assemblies 40 and a like plurality of hall effect switches 30 operably associated with the plurality of bi-color LED assemblies. The plurality of hall effect switches are spaced apart from each other by a distance equal to the center-to-center spacing between the parallel magnetic slats. The plurality of bi-color LED assemblies are also spaced apart from each other by a distance equal to the center-to-center spacing between the parallel magnetic slats. The bicolor LED assemblies are positioned and oriented to directly light the slats, one LED assembly per slat. The hall effect switches are positioned and oriented to sense a magnetic field passing close to each slat at a location behind the bottom wall of the first frame and operably associated with a bi-color LED assembly to change the emitted LED color lighting the slat when the magnetic field is sensed.

In a preferred embodiment of the invention, the liquid level indicator comprises a longitudinally elongated channel shaped frame 160 formed of a nonmagnetic material and defined by a first sidewall, a second sidewall parallel to the first sidewall, and a bottom wall connecting a bottom end of the first sidewall with a bottom end of the second sidewall. The elongated channel shaped frame has a longitudinal axis. a plurality of parallel pins 162 extend from the first sidewall to the second sidewall. The parallel pins are positioned parallel to the bottom wall and are longitudinally spaced apart from each other and the bottom wall and are normal to the longitudinal axis of the frame. The plurality of closely-spaced parallel magnetic slats are pivotally mounted to the parallel pins, one slat per pin. Each magnetic slat has a thickness, a height which is greater than the thickness, and a length which is greater than the height, and is positioned on a pin with its length extending parallel to the pin for pivoting movement around the pin and its height extending parallel to the longitudinal axis of the frame. Each of the plurality of magnetic slats has a magnetic axis parallel to its height, a first face having a first color, and an opposite second face having a second color which is optically discernable from the first face. The pins are spaced apart a first distance which is slightly greater than the height of the slats, so that adjacent slats are aligned with each other in an edge to edge relationship due to mutual magnetic attraction and have sufficient clearance between them to permit each slat to pivot without mechanical interference from adjacent slats. The apparatus is deployed with a tube 90, a float 100 positioned within the tube; and at least one magnet 110 positioned within the float. The first channel is mounted to the tube so that the slats are pivotable by the action of the magnet in the float and the hall effect switches sense the magnet in the float as the float passes by its closest point to the switch.

The circuit board includes a lowermost hall-effect switch/bi-color LED assembly pair on the board, a lowermost electrical circuit extending between the pair, and a lowermost multiple input AND gate device positioned in the lowermost electrical circuit. The lower-most multiple-input AND gate device receiving a single input from it's associated hall effect switch and it's remaining inputs from additional AND gate devices positioned in electrical circuits extending between hall-effect switches and bi-color LED assemblies serially above the lower-most AND gate device. The AND gate device output from matched inputs is a high voltage signal and an AND gate device output from mismatched inputs is a low voltage signal, so that a low voltage output from any one of the additional AND gate devices will result in the lowermost AND gate device producing a low voltage output.

The lowermost electrical circuit further comprises an amplifier positioned between the AND gate device and the bi-color LED assembly. The amplifier has an electrical output. The bi-color LED assembly has a first input leg electrically connected to the output of the amplifier and a second input leg electrically connected to the power source. The first input leg is driven to a lower voltage when the input from the AND gate device is driven to a lower voltage to extinguish light of the first color from the LED assembly and to produce light of the second color.

One embodiment of the invention provides a lighted tank gauging system that has a colored LED lighting interface that tracks the magnetic indicator gauge level. The tracking action is driven by the same magnetic field that sets the magnetic indicators between a high (e.g., black) and low (e.g., yellow).

The black-yellow boundary is the level indicator for the tank content a white light and a yellow light, for example, illuminates the black and yellow portions of the gauge, respectively.

The magnetic element that provides the force needed to operate the indicator bars in the gage is contained in the float that rides on the surface of the material in the tank. As the float moves past an indicator bar it causes it to rotate horizontally to present a yellow face if rising or a black face if descending. This passing magnetic field is sensed simultaneously by the hall effect switch.

The output from the hall effect switch sensor is sent to one input of a four input AND gate. All inputs are normally held in the high or 5 volt state. When one is driven low the gate output goes low. This causes the driver output to drive the junction of the two LED dropping resistors to ground, lighting the yellow LED and extinguishing the white, one. Both LEDs are co-located in a single package. When the magnet descends past the sensor the output goes high. This extinguishes the yellow light and illuminates the white one by putting a high drive to the LED dropping resistors.

In order to maintain the yellow lighting column the output of the active sensor drives the AND gate output low and that gate output is coupled to the next three lower AND gates. Each of those gates is coupled in cascade to the three gates below it. This maintains the yellow column with a high degree of reliability.

The power source in a preferred embodiment of the invention is constructed using a MAXIM MAX5035 PWM controller. It will accept DC inputs of 7.5 volts to 35 volts. Greater potentials will require the input capacitor to have its voltage rating increased. The power supply is designed to run from 12 vdc and to output 5 vdc at 1 amp maximum. Each LED board comes with its own power supply.

In a preferred embodiment, the system is installed in an extruded housing that mounts to the right or left side of the magnetic indicator housing. When installed, the power supply mounts to the bottom of the LED board by jumpers. The input wiring cascades from power supply to power supply in a multiple configuration. An external 5 volt supply may substitute for the system supplies but the operating voltage on any board must be maintained at 4.5 to 5.5 vdc or damage or improper operation will occur.

Preferably, the boards can be cut to the desired length. a white line is silkscreened on the top of the board where the cuts can be made. The board pieces can both be used. If the boards are not long enough, they can be cascaded to give the desired length.

While certain preferred embodiments of the invention have been described herein, the invention is not to be construed as being so limited, except to the extent that such limitations are found in the claims.

What is claimed is:

1. A liquid level indicator comprising
   a first elongated frame having a channel-shaped cross-section and formed from a nonmagnetic material and a bottom wall;
   a plurality of closely-spaced parallel magnetic slats pivotally mounted in the frame and extending across the channel, each of said slats having a first face of a first color and an oppositely-facing second face of a second color;
   a second longitudinally elongated channel shaped frame formed of a nonmagnetic material, the second frame comprising a first sidewall, a second sidewall parallel to the first sidewall, and a bottom wall connecting a bottom end of the first sidewall with a bottom end of the second sidewall, the second frame having a longitudinal axis and further comprising a mounting wall positioned parallel to the bottom wall which mounts the second frame to the first frame;

an elongated generally rectangular circuit board mounted inside of the channel of the second frame, said circuit board carrying a plurality of bi-color LED assemblies and a like plurality of hall effect switches operably associated with the plurality of bi-color LED assemblies, said plurality of hall effect switches being spaced apart from each other by a distance equal to the center-to-center spacing between the parallel magnetic slats and said plurality of bi-color LED assemblies being spaced apart from each other by a distance equal to the center-to-center spacing between the parallel magnetic slats, said bicolor LED assemblies being positioned and oriented to directly light the slats, one LED assembly per slat, said hall effect switches being positioned and oriented to sense a magnetic field passing close to each slat at a location behind the bottom wall of the first frame and operably associated with a bi-color LED assembly to change the emitted LED color lighting the slat when the magnetic field is sensed.

2. A liquid level indicator as in claim 1 wherein the first elongated frame comprises a longitudinally elongated channel shaped frame formed of a nonmagnetic material and defined by a first sidewall, a second sidewall parallel to the first sidewall, and a bottom wall connecting a bottom end of the first sidewall with a bottom end of the second sidewall, said elongated channel shaped frame having a longitudinal axis;

said liquid level indicator further comprising a plurality of parallel pins extending from the first sidewall to the second sidewall, said parallel pins being positioned parallel to the bottom wall and longitudinally spaced apart from each other and the bottom wall and extending normally to the longitudinal axis of the frame;

wherein the plurality of closely-spaced parallel magnetic slats are pivotally mounted to the parallel pins, one slat per pin, each said magnetic slat having a thickness, a height which is greater than the thickness, and a length which is greater than the height, and being positioned on a pin with its length extending parallel to the pin for pivoting movement around the pin and its height extending parallel to the longitudinal axis of the frame, each of the plurality of magnetic slats having a magnetic axis parallel to its height, a first face having a first color, and an opposite second face having a second color which is optically discernable from the first face;

wherein the plurality of parallel pins are spaced apart a first distance which is slightly greater than the height of the slats, so that adjacent slats are aligned with each other in an edge to edge relationship due to mutual magnetic attraction and have sufficient clearance therebetween to permit each slat to pivot without mechanical interference from adjacent slats; and each slat has a length which is at least three times its height to facilitate viewing of the slat face;

said apparatus further comprising a tube;

a float positioned within the tube; and a magnet positioned within the float;

wherein the first channel is mounted to the tube so that the slats are pivotable by the action of the magnet in the float and the hall effect switches sense the magnet in the float as the float passes by it's closest point to the switch.

3. A liquid level indicator as in claim 2 having an upper end and a lower end and further comprising a lowermost hall-effect switch/bi-color LED assembly pair on the board, a lowermost electrical circuit extending between the pair, a lowermost multiple input AND gate device positioned in the lowermost electrical circuit; said lower-most multiple-input AND gate device receiving a single input from it's associated hall effect switch and it's remaining inputs from additional AND gate devices positioned in electrical circuits extending between hall-effect switches and bi-color LED assemblies serially above the lower-most AND gate device, wherein an AND gate device output from matched inputs is a high voltage signal and an AND gate device output from mismatched inputs is a low voltage signal, so that a low voltage output from any one of the additional AND gate devices will result in the lowermost AND gate device producing a low voltage output.

4. A liquid level indicator as in claim 3 wherein the lowermost electrical circuit further comprises an amplifier positioned between the AND gate device and the bi-color LED assembly, said amplifier having an electrical output;

said bi-color LED assembly having a first input leg electrically connected to the output of the amplifier and a second input leg electrically connected to the power source, said first input leg being driven to a lower voltage when the input from the AND gate device is driven to a lower voltage, to extinguish light of the first color from the LED assembly and produce light of the second color.

* * * * *